March 10, 1931.                    M. CONDÉ ET AL                      1,795,711
                          TRACK SANDER FOR MOTOR VEHICLES
                           Filed March 26, 1930          2 Sheets-Sheet 1
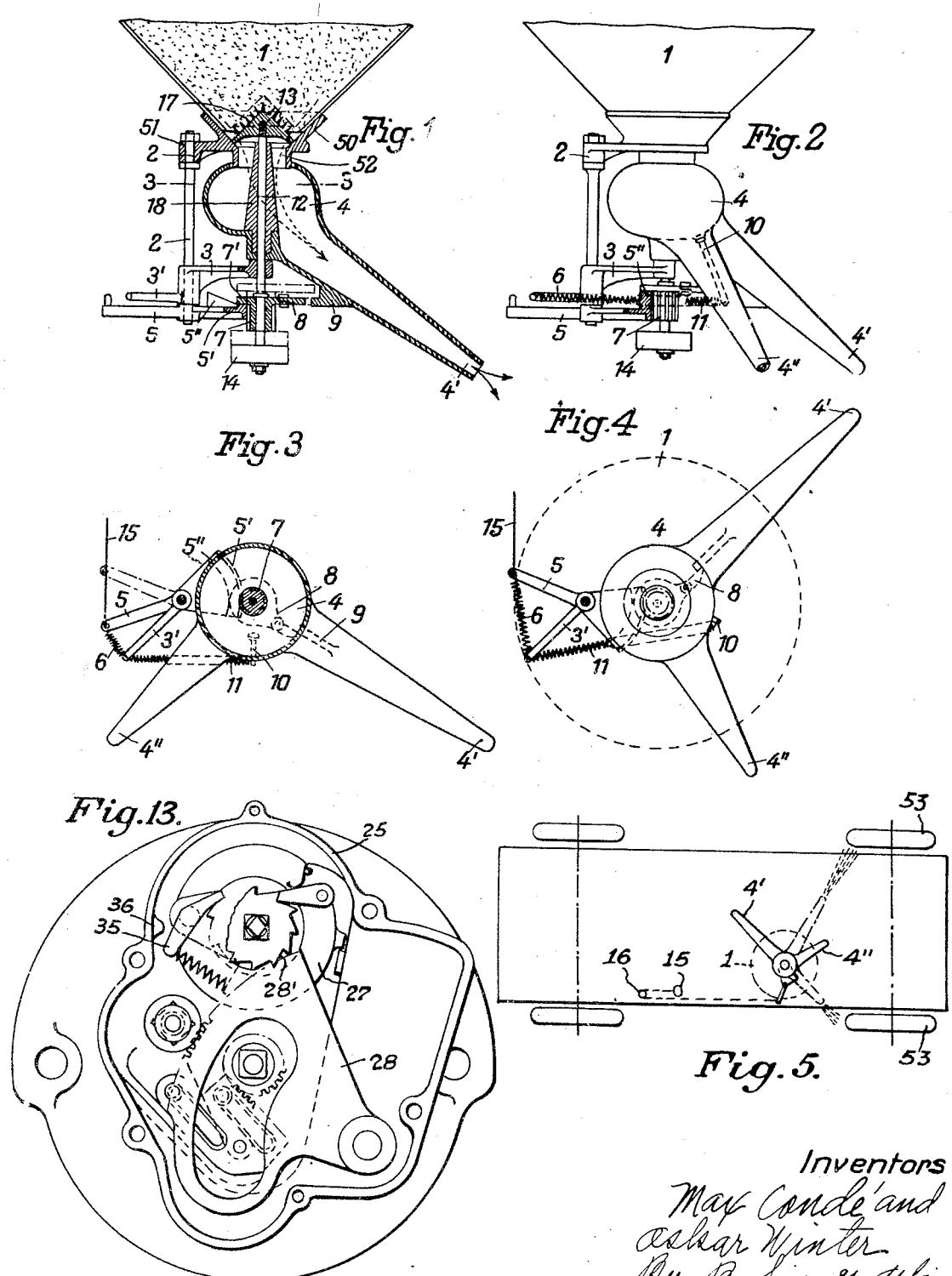

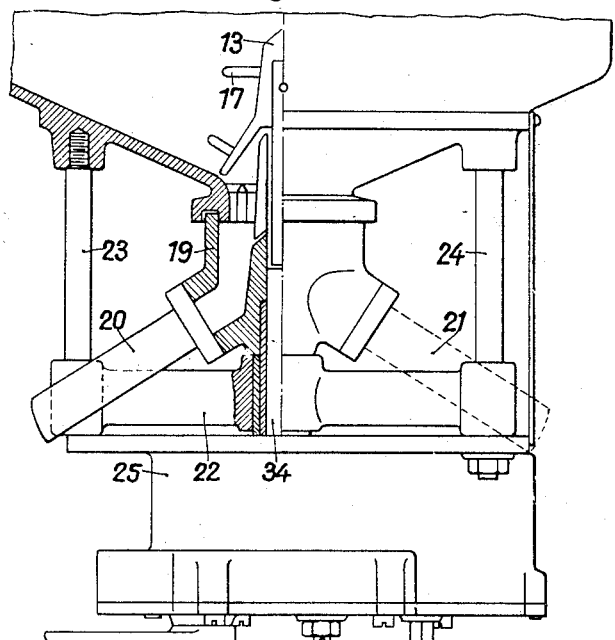
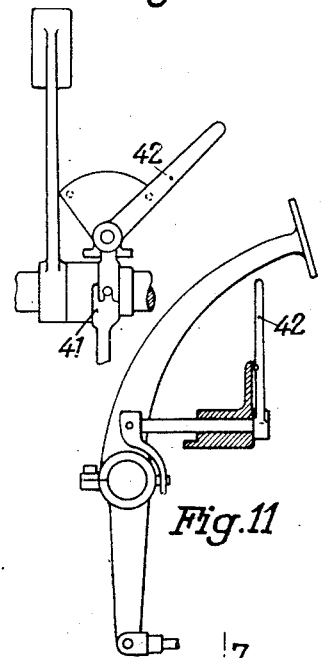
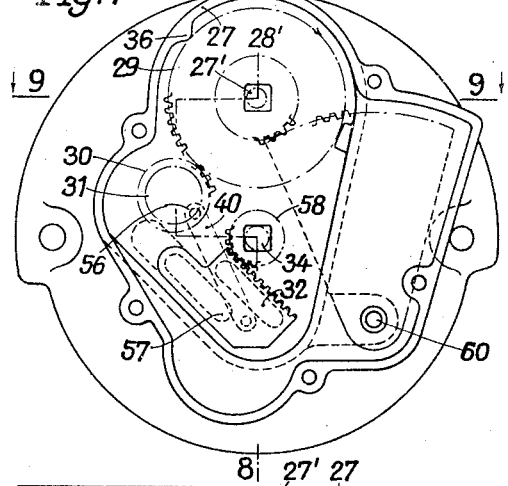
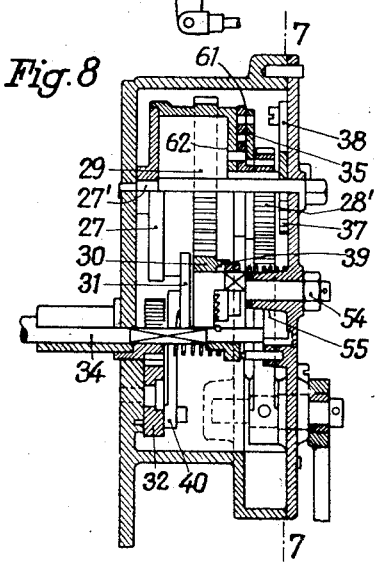
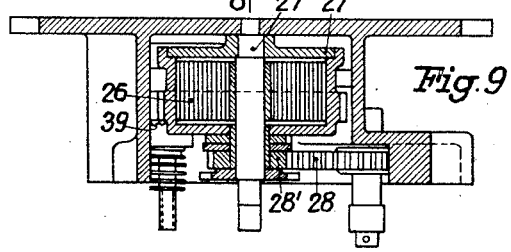

Patented Mar. 10, 1931

1,795,711

UNITED STATES PATENT OFFICE

MAX CONDÉ AND OSKAR WINTER, OF BERLIN, GERMANY

TRACK SANDER FOR MOTOR VEHICLES

Application filed March 26, 1930, Serial No. 439,150, and in Germany August 28, 1928.

Our invention relates to improvements in track sanders for motor vehicles, and more particularly in sanders of the type comprising rockable sand distributing nozzles. The object of the improvements is to provide a sander of this class in which below the delivery end of the sand container a receptacle is mounted for rocking about a vertical axis, the said receptacle being provided with a plurality of distributing pipes or nozzles one for each driving wheel disposed angularly of each other. In the preferred construction the said distributing pipes or nozzles are unsymmetrically arranged relatively to the receptacle so that the sander may be disposed laterally of the vehicle. The delivery ends of the pipes or nozzles are directed so that the sand is not delivered only in the direction of the movement of the vehicle, but more or less transversely thereof, so that the sand is delivered also to the sides of the track thus preventing slipping of the wheels in lateral direction.

Another object of the improvements is to provide a sander in which the receptacle receiving the sand from the container is connected with the valve or gate controlling the delivery of sand from the container to the receptacle, the said valve or gate being adapted to be moved upwardly for causing the delivery of sand when rocking the said receptacle and the pipes or nozzles connected therewith.

Other objects of the improvements will appear from the following description.

For the purpose of explaining the invention several examples embodying the same have been shown in the accompanying drawings, in which the same letters of reference have been used in all the views to indicate corresponding parts. In said drawings Fig. 1 is a sectional elevation showing the sander, Fig. 2 is an elevation thereof, Fig. 3 is a sectional plan view taken on the line 3—3 of Fig. 1, Fig. 4 is a top plan view of Fig. 2, Fig. 5 is a diagrammatical plan view showing a motor vehicle and the sander mounted thereon, Fig. 6 is an elevation partly in section showing a modification of the sander, Fig. 7 is a sectional plan view taken on the line 7—7 of Fig. 8, Fig. 8 is a sectional elevation taken on the line 8—8 of Fig. 7, Fig. 9 is a sectional elevation taken on the line 9—9 of Fig. 7, and Figs. 10 to 12 are detail views illustrating the gearing for connecting the sander with the brake mechanism.

Fig. 13 is a detail elevation of means for operating the valve.

In the example shown in Figs. 1 to 4 the sander comprises a container 1 having conical bottom walls and mounted on an annular member 50 formed with an arm 51 by means of which it is supported on a vertical pillar 2. Near the bottom of the said pillar there is a bracket 3 providing a bearing for a vertical rock shaft 12 carrying a valve 13 at its top, the said valve normally closing the delivery end of the container 1 and being provided with spikes 17 adapted to scratch the sand within the container. The shaft 12 is passed concentrically through a receptacle 4 having the tubular delivery end 52 of the ring 50 opening into the same. The container 4 is provided with two pipes or nozzles 4' and 4" having different lengths and disposed at an obtuse angle relatively to each other. For taking sand from the container the valve 13 is elevated and rotated for causing the spikes 17 to scratch sand from the body thereof. For this purpose the folowing mechanism is provided: On the pillar 2 a toothed segment 5' is rockingly mounted which is made integral with an arm 5 acted upon by a spring 6 and a rope 15, the said parts being adapted to impart rocking movement to the segment. On the top side of the segment 5' a cam 5" is provided which is formed with an inclined top face. The segment 5' is in mesh with a pinion 7 mounted on the shaft 12 and formed with a flange 7' bearing on the cam 5" of the toothed segment 5'. Thus when rocking the toothed segment 5' the shaft 12 and the valve 13 carried thereby are rotated and lifted, so that the sand is made loose and the delivery end of the container 1 is opened permitting the sand to slide downwardly into the container 4 from which it is delivered through the inclined pipes or nozzles 4' and 4" to the track of the wheels.

For distributing the sand thus delivered from the receptacle 4 the nozzles 4' and 4" are rocked about the vertical axis of the receptacle 4. The flange 7' is connected with an arm 8 adapted to engage a lug 9 fixed to or made integral with the pipe 4'. Further, a spring 11 is attached to an arm 10 secured to the receptacle 4 and to a relatively fixed arm 3' made integral with the bracket 3. When rotating the shaft 12 and the pinion 7 the arm 8 engages the lug 9 thus rocking the pipes 4' and 4" about the vertical shaft 12. Simultaneously the flange is lifted by the cam 5", so that after being rocked through a certain angle the arm 8 releases the lug 9, as is shown in Fig. 1 in broken lines. Thereafter the pipes 4' and 4" are returned into initial position by the spring 11.

At the end of the operation the valve 13 is placed on its seat by the body of sand bearing thereon. Preferably the shaft 12 is weighted by a body 14 secured to the bottom end thereof.

In Fig. 5 we have illustrated the manner of mounting the sander on a motor vehicle. As shown in the said figure the sander is mounted laterally on the body of the vehicle, and normally the pipes 4' and 4" are in inoperative position, as is shown in full lines. When operating the sander in the manner described above the pipes 4' and 4" are rocked into the position shown in dotted lines. Now the pipes are directed towards the front side of the driving wheels 53, and they deliver the sand to the front side of the said wheels and laterally thereof. Thereby also slipping of the driving wheels to the side when braking the same is prevented.

In the modification shown in Figs. 6 to 12 the main parts of the sander are similar in construction to corresponding parts shown in Figs. 1 to 4, and similar letters of reference have been used to indicate corresponding parts. The sander comprises a container 1 having a conical bottom end opening into a receptacle 19 adapted to be rocked about a vertical axis and provided with two distributing pipes or nozzles 20 and 21. The said receptacle is rotatably mounted on a cross member 22, and to the said cross member pillars 23 and 24 are secured which provide supports for the container 1. Below the cross member 22 there is a casing 25 enclosing the gearing and a motor for imparting reciprocating movement to the receptacle 19 and the pipes 20 and 21. In the example shown in the figures a spring actuated motor is provided for operating the gearing, and the said motor comprises a barrel 27 rotatably mounted on a shaft 27' mounted in the top and bottom walls of the casing 25. Within the said barrel there is a spiral spring which is attached with one end to the shaft 27' and with its opposite end to the barrel 27. Laterally of the barrel a crank disk 31 is located which is mounted on a vertical axis 54 secured to a lug 55 rising from the bottom of the casing 25, and the said shaft is connected with a pinion 30 meshing with gear teeth 29 provided on the barrel 27. To a crank pin 56 carried by the disk 31 a link 40 is connected which is connected at its opposite end to a rack 32 guided on pins 57 secured to the top wall of the casing 25 and engaging in slots of the rack. The said rack is in mesh with a pinion 58 secured to a shaft 34 carrying the receptacle 19 and the valve 13. By the mechanism described the rotary movement of the casing 27 is transmitted through the spur gears 29 and the gear wheel 30 to the crank disk 31, and by the said crank disk a plurality of reciprocating movements are imparted to the rack 32, which rack imparts rocking movements to the shaft 34, the receptacle 19, the pipes 20, 21 and the valve 13.

When the brake pedal is actuated the spring motor is wound up in the following way:

A gear sector 28 engages the pinion 28', and this pinion is loosely mounted on the shaft of the spring housing. The connection between the pinion and the spring housing is effected by a pawl 35, this pawl being pivotally secured to the spring housing and engaging a ratchet wheel connected with the pin 28'. When the pinion is rotated in a direction for tensioning the spiral spring mounted in the housing 27, the rotation of this pinion is transmitted through the pawl 35 to the spring housing, and the spring housing rotates with the pinion. The housing 25 is provided with a lug 36, Figure 7. When the spring housing rotates, the pawl rotates past this lug, engaging it by means of the arm extending beyond the pivotal support, and through this engagement it is lifted out of the ratchet, whereby the connection between the pinion 28' and the spring housing 27 is interrupted. The spring housing 27 can now rotate freely. Owing to this free rotability it is now rotated in the opposite direction because the spiral spring fixed in the interior of the housing is now untensioned. Owing to the rotation of the spring housing the tension of the spring is gradually released. In this manner the rock shaft for its nozzle is rocked back and forth, and the sprinkler nozzle also is rocked back and forth.

The degree to which the spring may be tensioned at first, and by means of which the speed of the spouts or nozzles may be regulated can be varied by turning the spindle of the spring housing, on which spindle the end of the spring is secured. This spindle is locked by the ratchet 37, secured thereto, and the locking pawl 38 mounted on the housing 25 engages the locking ratchet. The spindle projecting from the housing terminates in a square portion on which a key may be placed. When the locking pawl 38 has been disengaged, the spindle may be rotated as desired and then the locking pawl may be returned in this manner. The initial condition of the spiral spring and its pretension may be altered.

During the winding movement of the spring housing 27, the rack bar 32 must not be actuated, so that the spouts remain at rest. For this purpose there is interposed between the pinion 30, which absorbs the rotary movement of the spring housing and the crank disc 31 from which the rack bar 32 is actuated by the crank pin 56, a spring coupling or clutch 39. This coupling is operative in one direction only in a known way and the engagement of the pinion 30 and clutch disc 31 is interrupted when the slanting surface of the teeth pass over each other upon lifting one of these rings. Upon rotation in the opposite direction when the spring housing is being unwound, the rack teeth engage each other, and the pinion 30 is then in clutch connection with the clutch disc 31.

The power for rewinding the barrel is transmitted from the foot lever of the brake in the manner shown in Figs. 10 to 12, the gearing including a claw coupling 41 adapted to be set into and out of coupling position by means of a lever 42. Thus by operating the clutch the sander can be operated at any time where sanding of the track is necessary, and by reason of the construction of the spring motor and the gearing connecting the same with the receptacle 19 a plurality of reciprocating movements are imparted to the nozzles 20 and 21 upon each operation of the sander.

We claim:

1. A track sander for motor vehicles, comprising a container for sand, a receptacle in position for receiving sand from said container and mounted for rocking about an upright axis, a plurality of delivery nozzles connected with said receptacle in position for delivering sand to a plurality of wheels, and means for rocking said receptacle about said upright axis.

2. A track sander for motor vehicles, comprising a container for sand, a receptacle in position for receiving sand from said container and mounted for rocking about an upright axis, a plurality of delivery nozzles connected with said receptacle in position for delivering sand to a plurality of wheels, said nozzles having different lengths and being disposed relatively to each other at an obtuse angle, and means for rocking said receptacle about said upright axis.

3. A track sander for motor vehicles, comprising a container for sand, a receptacle in position for receiving sand from said container and mounted for rocking about an upright axis, a plurality of delivery nozzles connected with said receptacle in position for delivering sand to a plurality of wheels, means for rocking said receptacle about said upright axis, and a valve connected with said receptacle for controlling the supply of sand from said container to said receptacle.

4. A track sander for motor vehicles, comprising a container for sand, a receptacle in position for receiving sand from said container and mounted for rocking about a vertical axis, a valve connected with said receptacle and controlling the supply of sand from said container to said receptacle, a nozzle for delivering sand from said receptacle to the track, and means for rocking said receptacle about said upright axis and for lifting said valve away from its seat.

5. A track sander for motor vehicles, comprising a container for sand, a receptacle in position for receiving sand from said container and mounted for rocking about a vertical axis, a valve connected with said receptacle and controlling the supply of sand from said container to said receptacle, a nozzle for delivering sand from said receptacle to the track, a driven gear wheel connected with said valve, a driving gear wheel meshing with said driven gear wheel and carrying a cam in position for lifting said valve, means connected with said driven gear wheel for rocking said receptacle, and means for operating said driving gear wheel.

6. A track sander for motor vehicles, comprising a container for sand, a receptacle in position for receiving sand from said receptacle and mounted for rocking about a vertical axis and provided with a delivery nozzle, a rotary motor, and gearing intermediate said motor and receptacle for imparting a plurality of reciprocating rocking movements thereto upon each rotary movement of the motor.

7. A track sander for motor vehicles, comprising a container for sand, a receptacle in position for receiving sand from said receptacle and mounted for rocking about a vertical axis and provided with a delivery nozzle, a rotary motor, and crank mechanism intermediate said motor and receptacle for imparting a plurality of reciprocating rocking movements thereto upon each rotary movement of the motor.

8. A track sander for motor vehicles, comprising a container for sand, a receptacle in position for receiving sand from said receptacle and mounted for rocking about a vertical axis and provided with a delivery nozzle, a spring motor, gearing intermediate said motor and receptacle for imparting a plurality of reciprocating rocking movements thereto upon each rotary movement of the motor, the brake mechanism of the motor vehicle, and gearing intermediate said brake mechanism and spring motor for rewinding said spring motor.

9. A track sander for motor vehicles, comprising a container for sand, a receptacle in position for receiving sand from said receptacle and mounted for rocking about a vertical axis and provided with a delivery nozzle, a spring motor, gearing intermediate said motor and receptacle for imparting a plurality of reciprocating rocking movements thereto upon each rotary movement of the motor, the brake mechanism of the motor vehicle, and gearing intermediate said brake mechanism and spring motor for rewinding said spring motor, said gearing including a clutch for connecting and disconnecting said brake mechanism with said spring motor.

In testimony whereof we hereunto affix our signatures.

MAX CONDÉ.
OSKAR WINTER.